Figure 1:
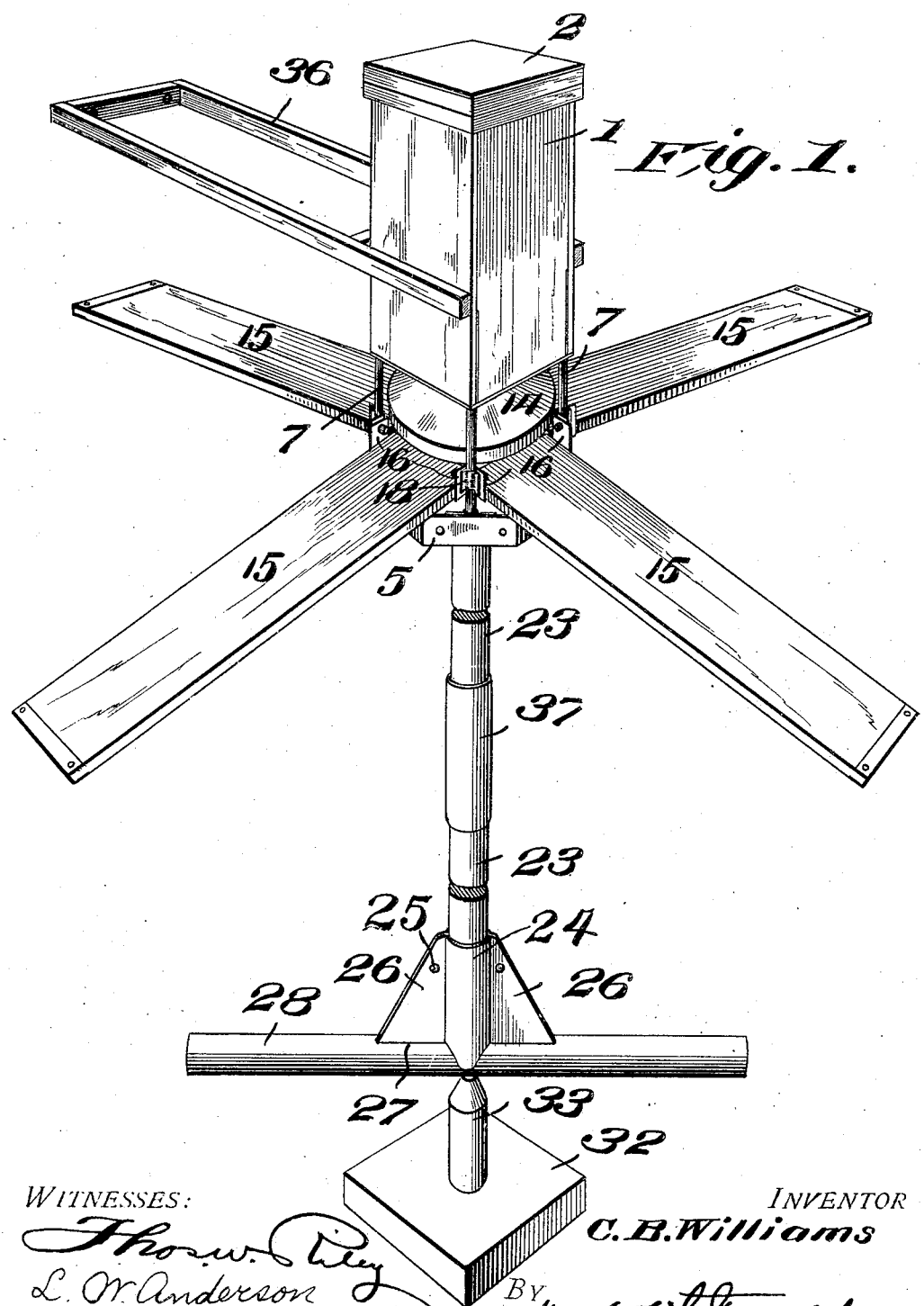

No. 877,538.

PATENTED JAN. 28, 1908.

C. B. WILLIAMS.
AUTOMATIC FEEDER.
APPLICATION FILED MAR. 8, 1907.

3 SHEETS—SHEET 1.

WITNESSES:
INVENTOR
C. B. Williams
By
W. J. Fitzgerald & Co.
Attorneys

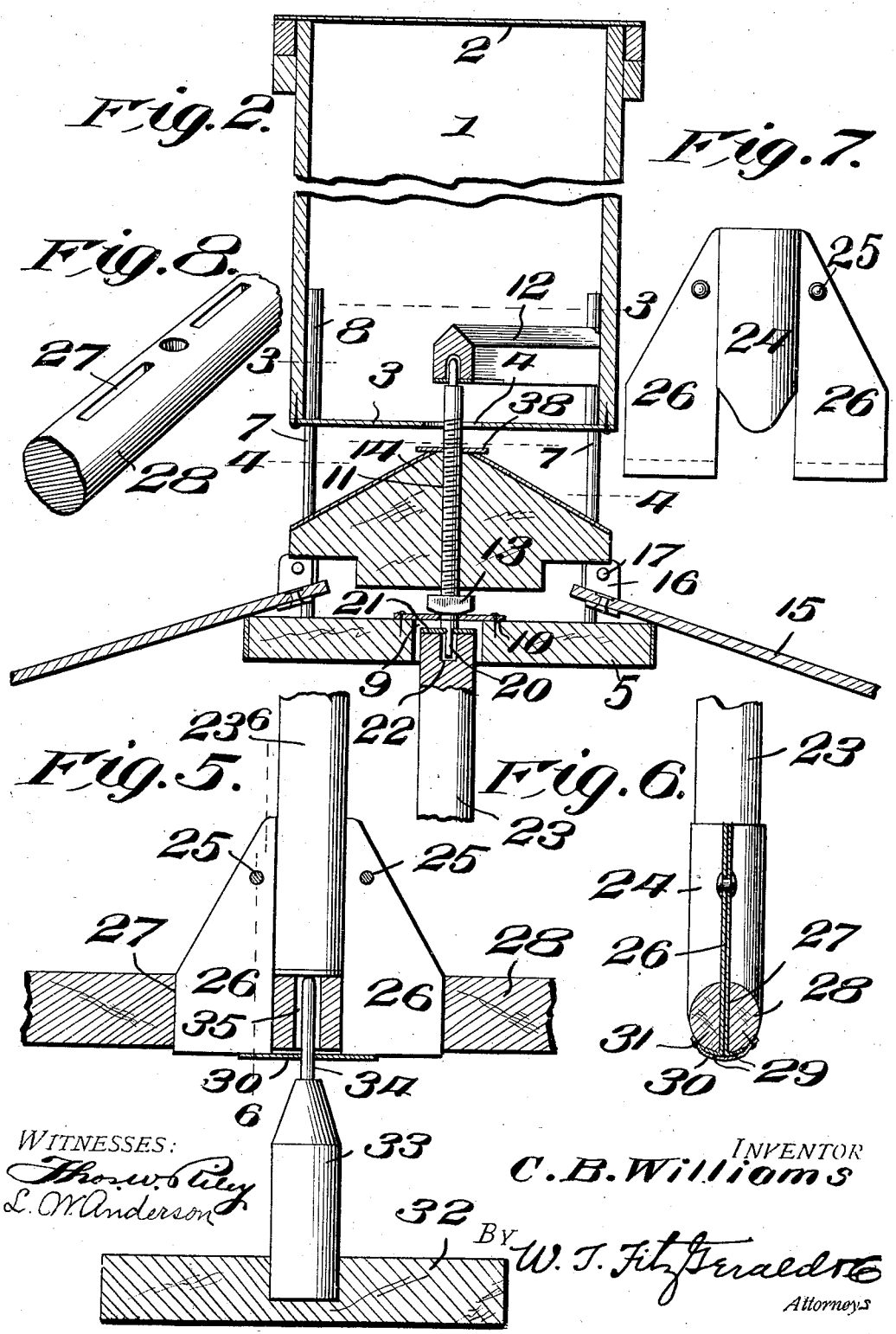

No. 877,538. PATENTED JAN. 28, 1908.
C. B. WILLIAMS.
AUTOMATIC FEEDER.
APPLICATION FILED MAR. 8, 1907.
3 SHEETS—SHEET 3.
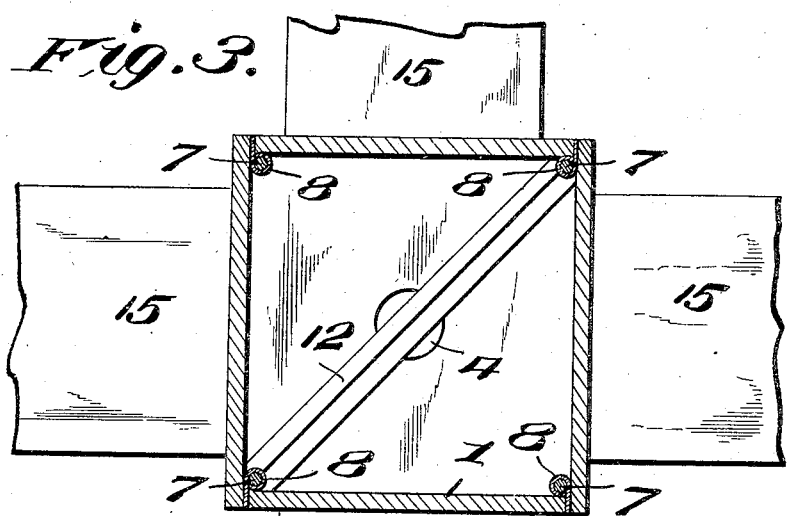
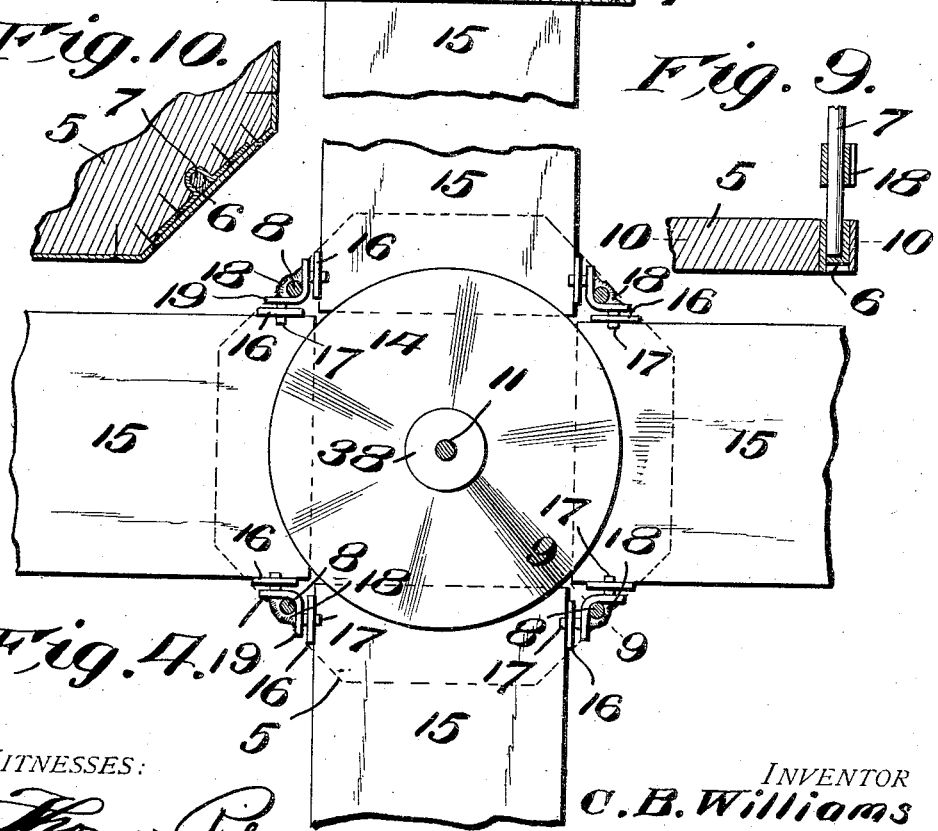
WITNESSES:
INVENTOR
C. B. Williams
By W. J. FitzGerald & Co
Attorneys

UNITED STATES PATENT OFFICE.

CHARLES BYRON WILLIAMS, OF ONTARIO, CALIFORNIA.

AUTOMATIC FEEDER.

No. 877,538.  Specification of Letters Patent.  Patented Jan. 28, 1908.

Application filed March 8, 1907. Serial No. 361,275.

*To all whom it may concern:*

Be it known that I, CHARLES BYRON WILLIAMS, a citizen of the United States, residing at Ontario, in the county of San Bernardino and State of California, have invented certain new and useful Improvements in Automatic Feeders; and I do hereby declare the following to be a full, clear, and exact description of the invention, such as will enable others skilled in the art to which it appertains to make and use the same.

My invention relates to new and useful improvements in automatic feeders and more particularly to that class adapted to be used for feeding grain or the like to poultry and my object is to provide means to automatically release food from the receptacle.

A further object is to provide means for scattering the food at a distance around the feeder.

A still further object is to provide means for regulating the flow of the food products from the feeder.

A still further object is to provide suitable bearings for parts of the feeder so that the same may be readily rotated.

Other objects and advantages will be hereinafter referred to and more particularly pointed out in the claims.

In the accompanying drawings which are made a part of this application, Figure 1 is a perspective view of my improved feeder complete. Fig. 2 is a detail sectional view of the upper end of the feeder on an enlarged scale. Fig. 3 is a transverse sectional view as seen on line 3—3 Fig. 2. Fig. 4 is a similar view as seen on line 4—4 Fig. 2. Fig. 5 is a detail elevation partly in section of the lower end of the feeder. Fig. 6 is a detail sectional view as seen on line 6—6 Fig. 5. Fig. 7 is a side elevation of an improved form of socket employed for holding parts of my improved device together. Fig. 8 is a detail perspective view of a perch employed at the lower end of the feeder. Fig. 9 is a detail sectional view as seen on line 9—9 Fig. 4, and, Fig. 10 is a detail sectional view as seen on line 10—10 Fig. 9.

Referring to the drawings in which similar reference numerals designate corresponding parts throughout the several views, 1 indicates the body of my improved feeder which is adapted to retain the food and is provided at its upper end with a cover 2, while the bottom 3 is provided at its central portion with an opening 4, through which the contents of the body is adapted to pass. Disposed at a distance from the lower end of the body 1 is a platform 5 which is preferably octagonal in general outline and has secured to the edges thereof sockets 6 in which are seated standards 7, said standards extending upwardly from the platform and into the body 1, said body having sockets 8 in each corner thereof into which the upper ends of the standards are adapted to enter and by which means the body is secured to the platform.

The central portion of the platform 5 is provided with an opening 9, the upper end of which is closed by means of a plate 10, and rotatably mounted at the central portion of the plate is a shaft 11 the upper end of which extends through the opening 4 and finds a bearing in a beam 12, extending across the interior of the body 1 and in order to hold the upper end of the shaft into engagement with the beam, a nut 13 is directed onto the shaft 11, which is adapted to rest upon the plate 10 to form a support for the shaft.

Adjustably mounted upon the shaft 11 is a substantially conical head 14 which is interiorly threaded to engage threads upon the shaft 11, said head being designed to move towards or from the opening 4 so that the flow of the contents from the body 1 will be accordingly decreased or increased. The head 14 is also circular in horizontal section so that the contents of the body will be distributed uniformly around the head and in order to carry the food at a distance from the base of the feeder, I have provided radiating arms 15 which are provided at their inner ends with ears 16 which are adapted to engage trunnions 17 carried by clips 18, said clips being directed around one portion of the standards 7 and fixed thereto by means of plates 19, said plates extending around the opposite portion of the standards 7 and are secured thereto in any preferred manner as by solder, the clips and plates being substantially V-shaped so that when they are placed in position upon the standards they will entirely surround the same and the trunnions 17 of the clips 18 will extend through openings in the plates 19.

The clips 18 are disposed a distance above the platform 5 so that when the arms are secured to the trunnions and lowered into engagement with the edge of the platform, said arms will be inclined so that the food deposited thereon by the head 14 will travel outwardly on the arms and be deposited at a distance from the head.

In order to positively rotate the head 14 and cause the food to descend from the body 1, I extend the shaft 11 through the plate 10 and into the opening 9, said extended end being flattened by cutting away portions of the shaft at diametrically opposite points thereby forming a tenon 20 which is adapted to extend through an angular slot in a plate 21 and into a bore 22 in the upper end of a supporting shaft 23.

The lower end of the shaft 23 is entered into a socket 24 which is preferably formed in two sections and secured together in any preferred manner as by rivets 25, said rivets extending through wings 26 formed on the sections of the socket so that when the wings of each section are alined with each other and secured together a complete circular socket is formed.

Each section of the socket is formed from one continuous section of material and the wings 26 are made longer than the part forming the socket and are adapted to extend through channels 27 formed in a perch 28, the channels 27 extending entirely through the perch and the wings 26 being of sufficient length to extend below the perch and are bent outwardly to form flanges 29 which extend into engagement with the lower surface of the perch thereby preventing a casual removal of the wings from the channels.

After the flanges 29 are properly placed, I secure over the same a curved plate 30, said plate being secured to the lower surface of the perch in any preferred manner as by brads 31 and when the plate is so disposed over the flanges the perch will be positively held into engagement with the wings.

The descent of the food from the body 1 depends upon the rotation of the head 14 and in order to rotate the head 14, I have provided the perch 28 and so balance the several parts of the feeder that when a fowl alights upon the perch the perch will be moved sufficiently to cause a quantity of the food to flow from the body 1 and be scattered over the ground adjacent to the feeder and in order to cause the head to be rotated from the slightest movement of the perch 28 I provide a base 32 which is adapted to rest upon the earth's surface and secured to the central portion of the base is a pedestal 33, to the upper end of which is secured a pivot pin 34 which is directed through an opening in the curved plate 31 and entered into a bore 35 in the lower end of the shaft 23, the connection between the shaft 23 and the pivot pin 34 being so sensitive that the slightest movement upon the perch 28 will result in partially rotating the head 14 so that a quantity of the food will be directed onto the arms 15 and deposited therefrom onto the earth's surface.

The feeder is retained in a vertical position in any preferred manner and in the accompanying drawing, I have shown a frame 36 which is adapted to be secured at one end to a building or other suitable object while the opposite end thereof is directed into engagement with the body 1 and secured thereto so that said body will be held concentric over the pivot pin 34.

For convenience in assembling the several parts of the feeder I preferably form the shaft 23 in two sections and secure the same together by means of a tubular coupling 37, said coupling being fixedly secured to the lower section while the upper section of the shaft extends into the coupling.

The arms 15 are so hinged to the trunnions 17 that said arms may be folded upwardly and rest against the outer walls of the body 1 so that the feeder will occupy but a small space when not in use. It will further be seen that by folding the arms as described that the egress of the food from the head 14 will be practically eliminated thereby preventing the successful operation of the feeder until the arms are again lowered and in order to prevent a continuous flow of the food from the opening 4 until such time as the head 14 is rotated I place upon the apex of the head and surrounding the shaft 11, a circular platform 38 which is greater in diameter than the diameter of the opening 4 so that the food descending through the opening will lodge upon the platform and gradually fill the opening thereby stopping the flow of the foon until such time as the head 14 is rotated, this operation agitating the food upon the circular platform so that the same will descend upon the head and be deposited upon the arms 15.

It will now be seen that I have provided a cheap and economical device for distributing food for fowls so that the fowls will be required to hunt for the same by scratching, thereby giving them exercise and it will further be seen that the feeder will be automatically operated by the fowls jumping off and on the perch 28.

It will further be seen that I have provided cheap and economical means for regulating the flow of the food from the body of the feeder and also for distributing the food around the feeder in uniformity.

What I claim is:

1. In a feeder of the class described, the combination with a body, a platform below said body and means to connect said platform with the body; of a head rotatably mounted between said platform and body, means to convey food at a distance from said feeder, a support for said body and platform and a perch adjacent the lower end of said support upon which a fowl may alight whereby said head may be rotated.

2. In a feeder of the class described the combination with a body, a platform below said body and standards securing said platform to the body; of a conical head between said platform and body, a shaft for said head, means to adjustably mount said head upon the shaft, bearings at opposite ends of said shaft, a supporting shaft below said platform, means to secure said supporting shaft to the first mentioned shaft and a pivotal support for the lower end of said supporting shaft.

3. In a feeder of the class described the combination with a body having an opening in the bottom portion thereof, a beam in the body, a platform below said body and means to secure said platform to the body; of a conical head between said platform and body, a shaft for said head, means to adjust said head upon the shaft, arms pivotally secured above said platform and adapted to rest thereon, a supporting standard for said body and platform, means to fix said standard to said shaft, a pedestal below said shaft and means to rotatably mount said shaft upon the pedestal.

4. In a feeder of the class described the combination with a body and a platform secured thereto; of a distributing head, means to rotatably mount said head between said platform and body, a pedestal below said body, a supporting shaft rotatably mounted on said pedestal and a perch at the lower end of said shaft.

5. In a feeder of the class described the combination with a body and a platform secured to said body; of a head between said platform and body, means to support said head, a shaft secured to said supporting means, a socket at the lower end of said shaft, a perch secured to said socket, a pedestal below said shaft and a pivot pin on said pedestal forming a bearing for the lower end of said shaft whereby the supporting shaft and head may be rotated.

6. In a feeder of the class described the combination with a body, a platform below said body and standards to secure said platform to the body; of arms pivotally secured to said standards and adapted to rest upon the platform when in their lowered position, a head between said platform and body adapted to direct the contents of the body on to said arms, a shaft for said head and means engaging said shaft to rotate said head.

7. In a feeder of the class described the combination with a body; of a supporting shaft for said body, a pedestal for said supporting shaft, a pivot pin connecting said shaft and pedestal, a perch for said supporting shaft, having channels therein and means to secure said perch to the supporting shaft comprising a socket formed in two sections, wings on said socket, means to secure said wings together, said wings being adapted to enter the channels in the perch and be secured thereto.

8. In a feeder of the class described the combination with a body and means to support the same; of a platform below said body, standards secured to said platform sockets in said body adapted to receive the upper ends of said standards, and a head between said platform and body, said head being adapted to be rotated whereby the contents of the body will be distributed equally around said body.

In testimony whereof I have signed my name to this specification in the presence of two subscribing witnesses.

CHARLES BYRON WILLIAMS.

Witnesses:
J. E. McComas,
Mrs. C. B. Williams.